United States Patent [19]
Carroll et al.

[11] Patent Number: 6,134,799
[45] Date of Patent: Oct. 24, 2000

[54] METHOD AND APPARATUS FOR VERIFYING PLACEMENT OF A REAR VIEW MIRROR MOUNTING BUTTON ON A MOTOR VEHICLE WINDSHIELD

[75] Inventors: Andrew G. Carroll, Southgate; Marc E. Hufnagel, St. Johns, both of Mich.

[73] Assignee: Chrysler Corporation, Auburn Hills, Mich.

[21] Appl. No.: 09/112,177

[22] Filed: Jul. 8, 1998

[51] Int. Cl.[7] .............................. G01B 5/25; B43L 7/12; G01D 21/00
[52] U.S. Cl. .................... 33/613; 33/600; 33/645
[58] Field of Search ........................ 33/613, 418, 419, 33/424, 425, 426, 452, 464, 465, 468, 469, 470, 471, 472, 534, 535, 538, 600, 644, 645

[56] References Cited

U.S. PATENT DOCUMENTS

| | | | |
|---|---|---|---|
| 1,834,389 | 12/1931 | Drescher | 33/418 |
| 2,358,451 | 9/1944 | Gardner | 33/468 |
| 2,649,784 | 8/1953 | Klimek | 33/468 |
| 5,471,758 | 12/1995 | White, Sr. | 33/469 |

*Primary Examiner*—Christopher W. Fulton
*Attorney, Agent, or Firm*—James R. Yee

[57] ABSTRACT

An apparatus for verifying placement of a rear view mirror mounting button on a motor vehicle windshield includes a first member pivotally attached to a second member for rotation about an axis. The first member includes a portion adapted to align the first member substantially perpendicular to an edge of the windshield. The second member is adapted to engage the mounting button such that the second member is aligned with a longitudinal axis of the mounting button. The apparatus further includes cooperating indicia carried by the first and second members for determining the accuracy of alignment between the first and second members.

19 Claims, 2 Drawing Sheets

METHOD AND APPARATUS FOR VERIFYING PLACEMENT OF A REAR VIEW MIRROR MOUNTING BUTTON ON A MOTOR VEHICLE WINDSHIELD

BACKGROUND OF THE INVENTION

1. Technical Field

The present invention generally relates to motor vehicle assembly. More particularly, the present invention relates to a method and apparatus for verification of placement of a rear view mirror mounting button on a motor vehicle windshield.

2. Discussion

Modern motor vehicles include rear view mirrors mounted to an inner surface of the windshield. A common technique for securing a rear view mirror to the windshield involves fixed attachment of a mounting button to the windshield with adhesive and subsequent attachment of the rear view mirror to the mounting button. The rear view mirror includes a mounting portion defining a channel for slidably receiving the mounting button. Proper mounting of the rear view mirror thus depends on correct placement of the mounting button on the windshield. Of specific importance is the angle of the mounting button relative to a vertical line.

While known techniques for mounting a rear view mirror of a motor vehicle to a windshield have proven to be acceptable, they are all associated with disadvantages. For example, it has been difficult to quickly and accurately determine the relative angle between the mounting button and a vertical line for verifying the accuracy of placement of the button.

SUMMARY OF THE INVENTION

It is a general object of the present invention to provide a method and apparatus for verifying placement of a rear view mirror mounting button on a motor vehicle windshield which overcomes the disadvantages associated with prior known techniques.

In one form, the present invention provides an apparatus for verifying placement of a rear view mirror mounting button on a windshield of a motor vehicle. The apparatus includes a first member and a second member. The first member includes a portion adapted to align the first member substantially perpendicular to an edge of the windshield. The second member is adapted to engage the mounting button such that the second member is aligned with the mounting member. The second member is pivotally attached to the first member for rotation about a pivot axis. The apparatus further includes cooperating indicia carried by the first and second members for determining the accuracy of alignment between the first and second members.

In another form, the present invention provides a method for verifying placement of a rear view mirror mounting button on a windshield of a motor vehicle. The method includes the general step of providing a measuring device having a first portion and a second portion. The method of the present invention additionally includes the general steps of aligning the first portion perpendicular to an edge of the windshield and aligning the second portion parallel to the mounting button. Further, the method of the present invention includes the general step of determining the angle between the mounting button and the edge of the windshield.

Additional benefits and advantages of the present invention will become to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
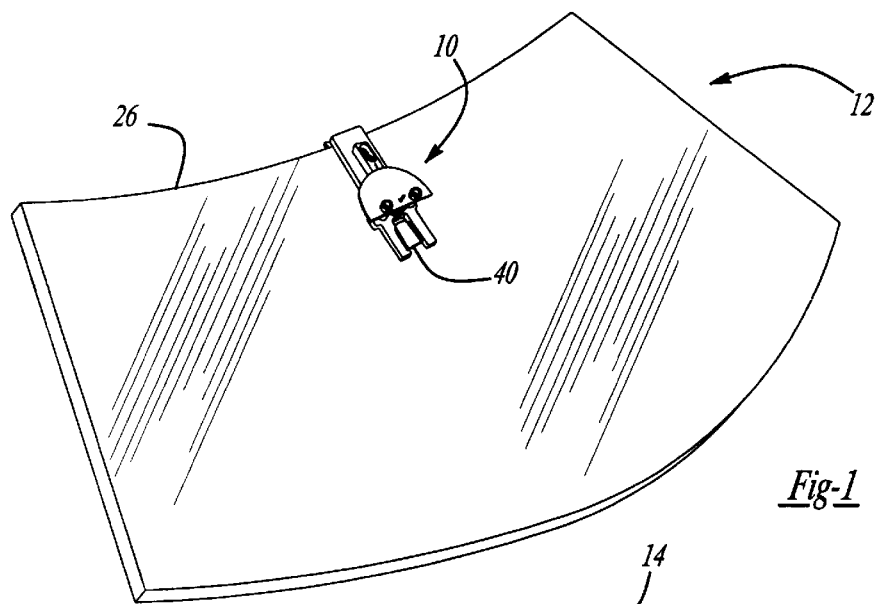
FIG. 1 is an environmental view illustrating an apparatus for verifying placement of a rear view mirror mounting button on a motor vehicle windshield operatively associated with a mounting button and a windshield.

With initial reference to the environmental view of FIG. 1, an apparatus for verifying placement of a rear view mounting button on a motor vehicle windshield constructed in accordance with a preferred embodiment of the present invention is generally identified with reference numeral 10. The apparatus 10 is shown operatively associated with a motor vehicle windshield 12. It will be understood by those skilled in the art that the particular windshield shown is merely exemplary.

Figure 2:
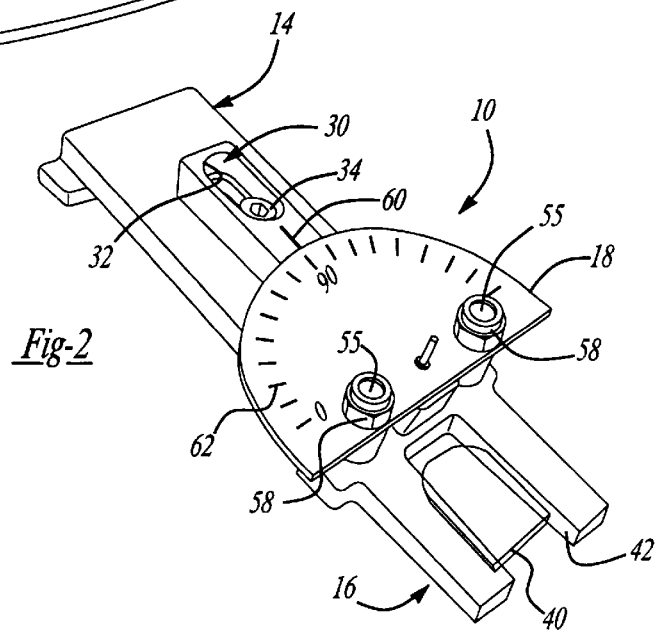
FIG. 2 is a enlarged perspective view of the apparatus of FIG. 1.
Figure 3:
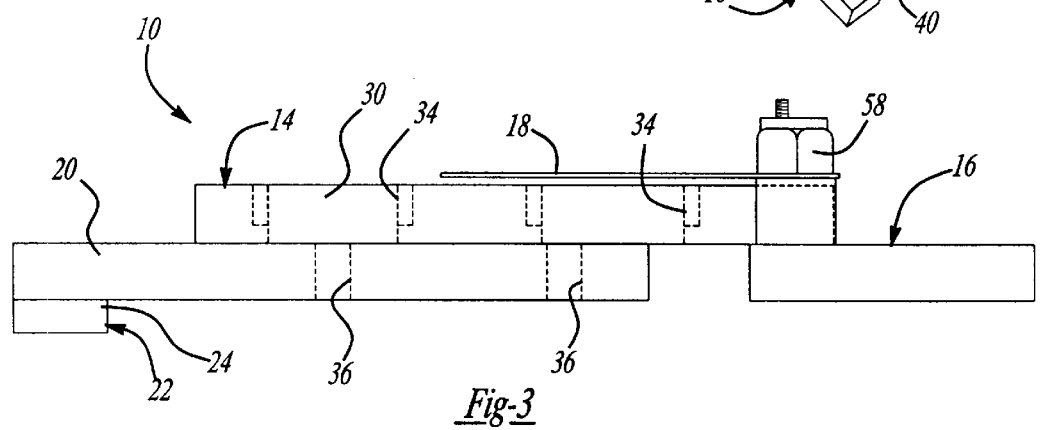
FIG. 3 is a enlarged side view of the apparatus of FIG. 1.
Figure 4:
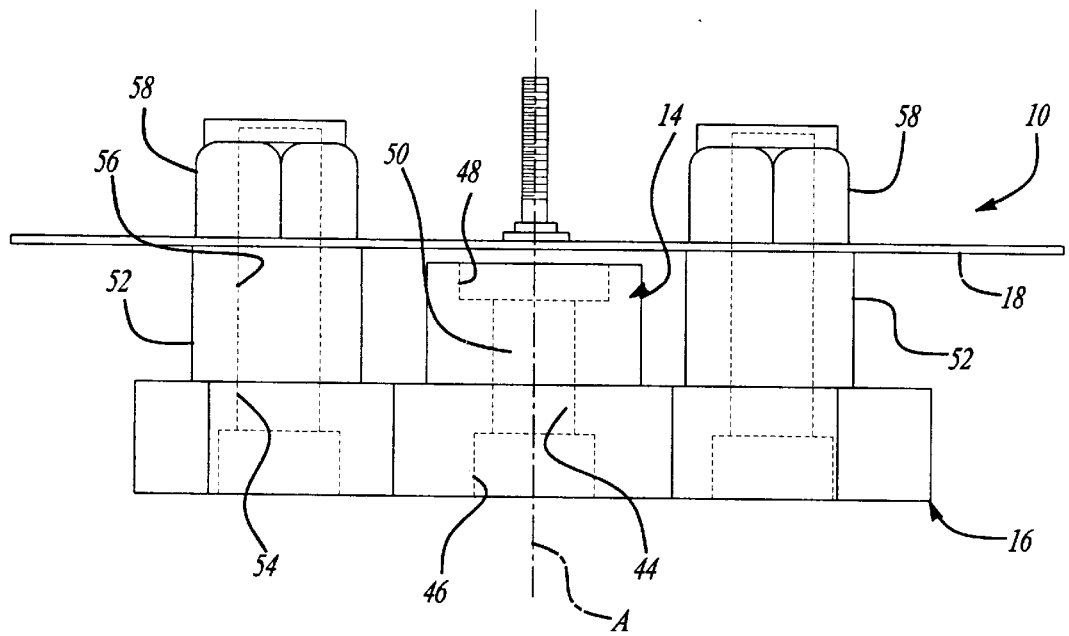
FIG. 4 is a enlarged front view of the apparatus of FIG. 1.

With continued reference to FIG. 1 and additional reference to FIGS. 2–4, the apparatus 10 of the present invention will be further described. The apparatus 10 is shown to generally include a first member 14 and a second member 16. In the exemplary embodiment illustrated, the first and second members 14 and 16 are constructed of nylon and pivotally interconnected for relative movement about a pivot axis A (identified in FIG. 4). The apparatus 10 further generally includes a measuring device 18 for determining the relative angle between the first and second members 14 and 16.

The first member 14 is shown to include a base 20 and a locating portion 22. The locating portion 22 includes a locating surface 24 adapted to engage an edge 26 of the windshield 12. As shown in the environmental view of FIG. 1, the locating portion 22 may engage, for example, an upper edge 26 of the windshield 12. The locating surface 24 is aligned perpendicular to a longitudinal axis of the base 20. Thus, by abutting the locating surface 24 against the edge 26 of the windshield 12, the first member 14 is aligned substantially perpendicular to the edge 26 of the windshield 12. Where the edge 26 of the windshield 12 is an upper horizontal edge, the first member 14 is aligned substantially parallel to the intended vertical.

The first member 14 further includes an arm 30 adjustably attached to the base 20. The arm 30 defines a pair of elongated slots 32. The elongated slots 32 are countersunk and are each adapted to receive fasteners 34. The fasteners 34 engage apertures 36 provided in the base 20. The elongation of the slots 32 allows the arm 30 to be linerally adjusted relative to the base 20.

The second member 16 is adapted to engage a rear view mirror mounting button 40 such that a longitudinal axis of the second member 16 is aligned with the mounting button 40. The second member 16 includes a main body portion having a generally U-shape defining a recess 42 for receiving the mounting button 40. In the embodiment illustrated, the second member 16 defines a recess 44 including a countersunk portion 46 for receiving a fastener (not specifically shown). The fastener is adapted to engage a nut (not specifically shown) provided in a countersunk portion 48 of an aligning aperture 50 in the arm 30, thereby defining the pivot axis A.

In the exemplary embodiment illustrated, the measuring device is illustrated as a standard 3" steel protractor 18. The protractor 18 is mounted to the second member 16 on a pair of upwardly extending boss portions 52. Threaded fasteners 55 pass through apertures provided in the second member 16, apertures 56 provided in the boss portions 52 and holes (not shown) in the protractor 18. A nut 58 is threaded on to each of the upwardly extending ends of the fasteners 55.

Cooperating indicia is carried by the first and second members 14 and 16 for determining the accuracy of alignment between the first and second members 14 and 16. In the exemplary embodiment illustrated, the cooperating indicia includes a reference line 60 provided on the arm 30 of the first member 14 and conventional angle markings 62 provided on the protractor 18. Further, in the exemplary embodiment illustrated, when the first and second members 14 and 16 are aligned, the protractor reads 90°, indicating that the longitudinal axis of the mounting button 40 extends perpendicular to the horizontal upper edge 26 of the windshield 12. It will be appreciated by those skilled in the art that alternatively the protractor 18 may be mounted for rotation with the first member 14.

Figure 5:
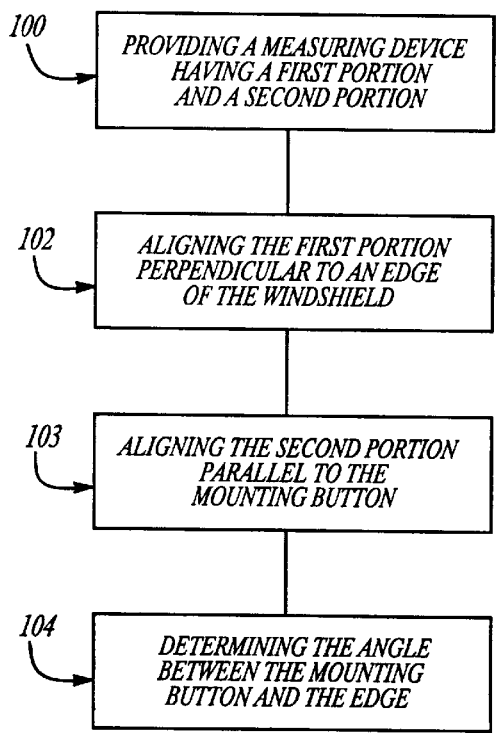
FIG. 5 is a flow diagram illustrating the general steps of a preferred method of the present invention for verifying placement of a rear view mirror mounting button on a motor vehicle windshield.

With continued reference to FIGS. 1–4 and additional reference to FIG. 5, the method of the present invention will be discussed. In a first general step 100, a measuring device such as the apparatus 10 which includes the first portion 14 and the second portion 16 is provided. In a second general step 102 the first portion 14 is aligned perpendicular to the edge 26 of the windshield 12. In a third general step, the second portion 16 is aligned parallel to a longitudinal axis of the mounting button 40. In a fourth general step, the angle between the mounting button 40 and the edge 26 of the windshield 12 is determined.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

We claim:

1. An apparatus for verifying placement of a rear view mirror mounting button on a windshield of a motor vehicle, the apparatus comprising:

a first member including a portion adapted to align said first member substantially perpendicular to an edge of the windshield;

a second member adapted to engage the mounting button such that said second member is aligned with the mounting button, said second member pivotally attached to said first member for rotation about a pivot axis, wherein said second member being generally U-shaped and defining an opening for receiving the mounting button; and cooperating indicia carried by said first and second members for determining the accuracy of alignment between said first and second members.

2. The apparatus for verifying placement of a rear view mirror mounting button on a windshield of a motor vehicle of claim 1, further comprising a protractor carried by one of said first and second members and a reference line carried by the other of said first and second members.

3. The apparatus for verifying placement of a rear view mirror mounting button on a windshield of a motor vehicle of claim 2, wherein said second member includes a pair of boss portions and said apparatus further includes a pair of threaded fasteners passing through said boss portions and adapted to secure said protractor to said second member.

4. The apparatus for verifying placement of a rear view mirror mounting button on a windshield of a motor vehicle of claim 1, further comprising means for adjusting the distance between said portion of said first member and said pivot axis.

5. The apparatus for verifying placement of a rear view mirror mounting button on a windshield of a motor vehicle of claim 1, wherein said first member includes a base and an arm adjustably interconnected to said base, said second member being pivotally attached to said base.

6. The apparatus for verifying placement of a rear view mirror mounting button on a windshield of a motor vehicle of claim 5, wherein said arm is linearly adjustable relative to said base.

7. The apparatus for verifying placement of a rear view mirror mounting button on a windshield of a motor vehicle of claim 1, wherein said first and second members are constructed of nylon.

8. The apparatus for verifying placement of a rear view mirror mounting button on a windshield of a motor vehicle of claim 1, in combination with the mounting button.

9. A system for mounting a rear view mirror to a windshield of a motor vehicle, the apparatus comprising:

a mounting button adapted to fixedly mount to the windshield;

a first member including a portion adapted to align said first member substantially perpendicular to an edge of the windshield;

a second member adapted to engage the mounting button such that said second member is aligned with the mounting button, said second member pivotally attached to said first member for rotation about a pivot axis; and cooperating indicia carried by said first and second members for determining the accuracy of alignment between said first and second members.

10. The system for mounting a rear view mirror to a windshield of a motor vehicle of claim 9, further comprising a protractor carried by one of said first and second members and a reference line carried by the other of said first and second members.

11. The system for mounting a rear view mirror to a windshield of a motor vehicle of claim 9, further comprising means for adjusting the distance between said portion of said first member and said pivot axis.

12. The system for mounting a rear view mirror to a windshield of a motor vehicle of claim 9, wherein said first member includes a base and an arm adjustably interconnected to said base, said second member being pivotally attached to said base.

13. The system for mounting a rear view mirror to a windshield of a motor vehicle of claim 12, wherein said arm is linearly adjustable relative to said base.

14. The system for mounting a rear view mirror to a windshield of a motor vehicle of claim 9, wherein said first and second members are constructed of nylon.

15. The system for mounting a rear view mirror to a windshield of a motor vehicle of claim 9, wherein said second member is generally U-shaped and defines an opening for receiving said mounting button.

16. The system for mounting a rear view mirror to a windshield of a motor vehicle of claim 9, wherein said second member includes a pair of boss portions and said apparatus further includes a pair of threaded fasteners passing through said boss portions and adapted to secure said protractor to said second member.

17. A method for verifying placement of a rear view mirror mounting button on a windshield of a motor vehicle, the method comprising the steps of:

providing a measuring device having a first portion and a second portion;

aligning said first portion perpendicular to an edge of the windshield;

aligning said second portion parallel to the mounting button; and determining the angle between the mounting button and the edge of the windshield.

18. The method for verifying placement of a mounting button on a windshield of a motor vehicle of claim 18, further comprising the step of pivotally interconnecting said first portion and said second portion for relative movement about a pivot axis.

19. The method for verifying placement of a mounting button on a windshield of a motor vehicle of claim 17, further comprising the step of adjusting said pivot axis relative to the edge of the windshield.

* * * * *